United States Patent
Rödel-Krainz

(10) Patent No.: US 7,782,004 B2
(45) Date of Patent: Aug. 24, 2010

(54) METHOD OF ADJUSTING A PLURALITY OF SUCCESSIVE POSITION-CONTROLLED AXES IN AN ADJUSTING STROKE

(75) Inventor: Johann Rödel-Krainz, Ottensoos (DE)

(73) Assignee: Siemens Aktiengesellschaft, Munich (DE)

( * ) Notice: Subject to any disclaimer, the term of this patent is extended or adjusted under 35 U.S.C. 154(b) by 382 days.

(21) Appl. No.: 11/921,993

(22) PCT Filed: Jun. 8, 2006

(86) PCT No.: PCT/EP2006/063000

§ 371 (c)(1),
(2), (4) Date: Dec. 11, 2007

(87) PCT Pub. No.: WO2006/134059

PCT Pub. Date: Dec. 21, 2006

(65) Prior Publication Data

US 2009/0289592 A1   Nov. 26, 2009

(30) Foreign Application Priority Data

Jun. 14, 2005   (DE) ...................... 10 2005 027 435

(51) Int. Cl.
G05B 11/32 (2006.01)
(52) U.S. Cl. ...................... 318/625; 318/560
(58) Field of Classification Search ............... 318/625, 318/560, 632
See application file for complete search history.

(56) References Cited

U.S. PATENT DOCUMENTS

| 4,093,904 | A | 6/1978 | Burig et al. |
| 4,750,104 | A * | 6/1988 | Kumamoto et al. ........... 700/56 |
| 5,086,263 | A | 2/1992 | Kubota et al. |
| 6,046,566 | A * | 4/2000 | Sonoda et al. ............... 318/625 |
| 6,859,007 | B2 * | 2/2005 | Toyozawa et al. ........... 318/632 |
| 6,861,816 | B2 * | 3/2005 | Eguchi ....................... 318/632 |
| 2002/0133244 | A1 | 9/2002 | Schroder et al. |
| 2004/0133287 | A1 | 7/2004 | Gabler et al. |

FOREIGN PATENT DOCUMENTS

| DE | 40 42 275 A1 | 7/1992 |
| DE | 195 29 430 A1 | 1/1997 |
| DE | 101 04 795 A1 | 9/2002 |
| EP | 0 436 209 A2 | 7/1991 |
| EP | 0 753 802 A1 | 1/1997 |
| EP | 0 837 379 A1 | 4/1998 |
| WO | WO 02/082192 A2 | 10/2002 |

* cited by examiner

Primary Examiner—Bentsu Ro
Assistant Examiner—David S Luo

(57) ABSTRACT

A control axis is subordinated to a plurality of position-controlled successive axes. It is determined, while an adjusting stroke, an initial theoretical position value for each successive axis by means of the position value or the temporal derivation of the position value of the control axis, in detecting for each successive axis a real position value, in determining a train interval by means of the real position value and the initial value position, in determining a deviation value which is valid for all successive axes by means of the train interval thereof and in determining again a final theoretical position value by means of the deviation value in connection with the real position value and in adjusting the position value for each successive axis by means of said final theoretical position value.

20 Claims, 6 Drawing Sheets

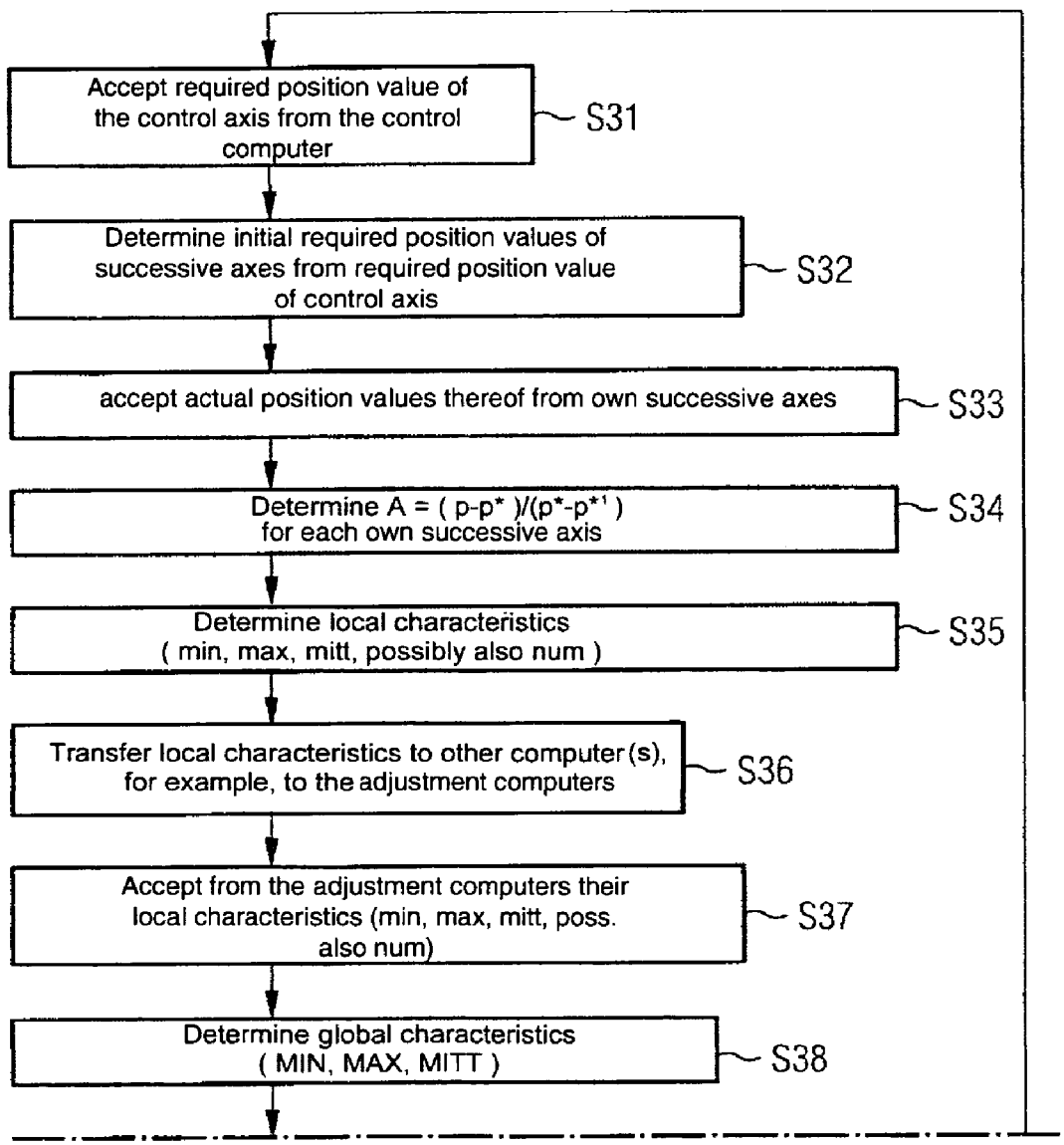

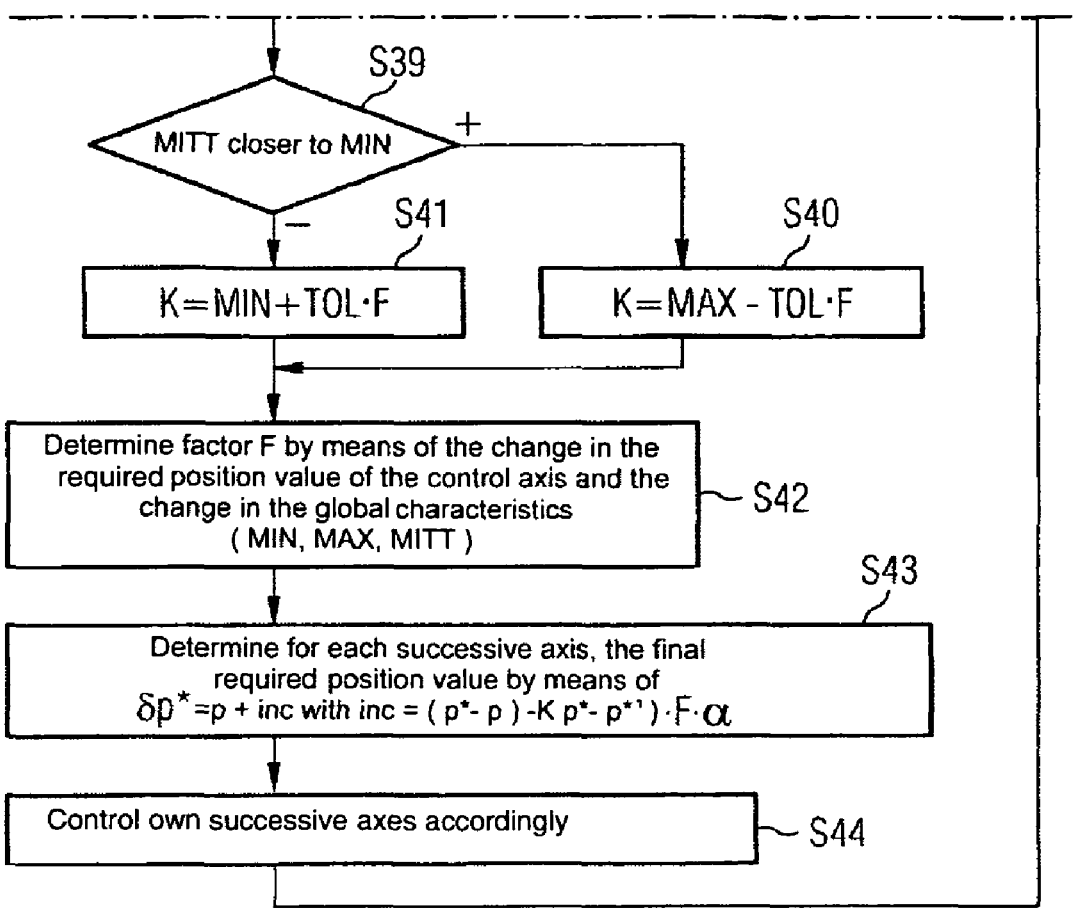

METHOD OF ADJUSTING A PLURALITY OF SUCCESSIVE POSITION-CONTROLLED AXES IN AN ADJUSTING STROKE

CROSS REFERENCE TO RELATED APPLICATIONS

This application is the US National Stage of International Application No. PCT/EP2006/063000, filed Jun. 8, 2006 and claims the benefit thereof. The International Application claims the benefits of German application No. 10 2005 027 435.8 DE filed Jun. 14, 2005, both of the applications are incorporated by reference herein in their entirety.

FIELD OF INVENTION

The present invention relates to a control method for an axis arrangement which has a number of auxiliary position-controlled axes in a control cycle, with in each control cycle
 a specific initial required position value being determined for each auxiliary axis by means of the position value or the temporal derivation of the position value of a control axis not integrated into the axis arrangement and to which a number of auxiliary axes are subordinate and
 a specific actual position value being detected for each auxiliary axis and a specific tracking error being determined by means of the specific actual position value and the specific initial set position value of the specific auxiliary axis.

The present invention, additionally relates to a data medium with a computer program stored in the data medium for a computer in order to carry out such a control method. Finally, the present invention also relates to a computer with such a data medium.

BACKGROUND OF INVENTION

In the prior art and also in the present invention a distinction is made between axes and drives. A technological object (i.e. a software entity) is usually referred to as an axis and an actual physical object (e.g. a motor or a power part) as a drive. Normally, an axis powers a drive. Whereas, on the other hand an axis does not power a drive, such an axis is referred to as a virtual axis.

Control methods of the type mentioned in the introduction are above all used if a synchronization is to be ensured at a number of axes (including the control axis). In such cases the prior art involves constant monitored of whether the tracking errors of the auxiliary axes remain within predetermined tolerance ranges. If they do, the control method (=normal operation) is continued. Whereas, on the other hand, in case of an error, as a result of which one of the auxiliary axes leaves its permissible tolerance range, it is possible to switch to an error mode, in which it is possible to deviate from normal operation if required. A control method can for example be implemented, in which said auxiliary axis now becomes the new control axis. An example of this procedure is to be found in DE-C-195 29 430.

SUMMARY OF INVENTION

The prior art method has a plurality of disadvantages. In this way, it is for example necessary to detect an error as such immediately and directly, in order to be able to switch to the error mode in time. In addition, an individual control concept and if required differing from normal operation is necessary. For this purpose, a corresponding programming must be present. It is also possible that by switching to the error mode, subsequent errors are generated again, for example, exceeding the control cycle or exceeding a tolerance range of another auxiliary axis. Finally the prior art method often fails on the occurrence of multiple errors.

A control method for an axis arrangement which has a number of auxiliary position-controlled axes in a control cycle is known from WO 02/082192 A2. In the case of this control method, in each control cycle a specific initial set position value is determined for each auxiliary axis by means of the position value or the temporal derivation of the position value of a control axis not integrated into the axis arrangement and to which a number of auxiliary axes are subordinated. In addition, in each control cycle, an actual position value is detected for each auxiliary axis. In addition, a deviation value which is valid for all auxiliary axes is determined. The deviation value is included in the determination of the initial set position values. The deviation value is determined by means of a tracking error, which is determined on the basis of detecting the register marks of a material track, which are jointly transported by the axes. The register marks are detected by means of a single sensor device. The detection is carried out from time to time only and not in control cycle.

An object underlying the present invention is thus to further develop a control method of the type mentioned in the introduction, in such a way that the disadvantages of the prior art are avoided. It is, in particular, to be possible to manage at least single errors within the framework of normal operation.

The object is achieved by a deviation value which is valid for all the auxiliary axes being determined in each control cycle by means of the tracking errors thereof and, for each auxiliary axis, by a respective final set position value being determined by means of the deviation value and the actual position value of said auxiliary axis and the specific position value for each auxiliary axis being controlled.

By contrast with the prior art, in the case of the present invention, the control axis is thus not integrated in the axis arrangement as well. It is therefore not critical if tracking errors build up between the control axis and auxiliary axes. The control axis thus does not have to be synchronized with the auxiliary axes. It must only be ensured that the tracking errors of the auxiliary axes lie within predetermined tolerance ranges in relation to one another. This is guaranteed by the inventive method.

If the tracking errors determined for the auxiliary axes are suitably standardized, said tracking errors can be compared immediately and directly with one another. In this process, an example of a standardized tracking error is the difference between the set position value and the actual position value of a auxiliary axis, divided by the change in the set position value of the specific auxiliary axis within a control cycle. This tracking error for example possesses the properties that it
 is proportional to the difference between the set position value and the actual position value,
 is independent of a synchronization relationship,
 is unitless,
 supplies a direct reference to the control axis and
 can be compared to the tracking errors of other auxiliary axes without further conversion or transformation.

The control axis can be a real axis, which is outside the synchronized axis arrangement. However, the control axis is preferably a virtual axis.

For the implementation of the inventive control method, global characteristics can for example be determined by means of the tracking errors of all the auxiliary axes, preferably on a statistical basis, by means of which it can be identified whether at least one of the auxiliary axes clearly exhibits a tracking error other than that of the other auxiliary axes. In this case, the deviation value is determined in such a way by means of the global characteristics that the other auxiliary axes at least have a tendency to follow the at least one auxiliary axis which clearly exhibits a tracking error other than that of the other auxiliary axes.

An especially advantageous development of the control method in accordance with the invention is produced, if

- the auxiliary axes are combined into axis groups with at least one auxiliary axis in each case,
- the auxiliary axes of each axis group are position-controlled by means of a control computer in each case,
- every control computer determines the tracking errors of the auxiliary position-controlled axes,
- every control computer determines a number of local characteristics by means of the tracking errors determined by it and outputs it by means of a bus system to which at least the control computers are connected,
- the local characteristics of at least one correction computer connected to the bus system are received and
- the at least one correction computer determines the global characteristics by means of the local characteristics of the control computers, determines the deviation value by means of the global characteristics and makes available at least one deviation value to the control computer.

The method has the advantage—in particular in the case of larger axis assemblies with for example 15 to 20 control computers with 5 to 10 auxiliary position-controlled axes in each case—of considerably reducing the computation outlay and the communication effort.

As an alternative, the correction computer can be distributed over the control computers or can even be a master computer.

The local characteristics can be the tracking errors between the auxiliary position-controlled axes and the specific control computer itself. However, the number of local characteristics for all the control computers is preferably the same and independent of the number of auxiliary axes, the position of which is controlled by the specific control computer and also independent of the maximum number of auxiliary axes that can be controlled by the specific control computer in each case. As a result, the reaction time for determining a deviation value is then almost independent of the number of auxiliary position-controlled axes.

The local characteristics of the control computers are preferably characteristic of the minimum, the maximum and the average value of the tracking errors between the auxiliary position-controlled axes and the specific control computer. If necessary, the local characteristics can, in addition, also be characteristic of a number of auxiliary axes, the position of which is controlled by the specific control computer in each case. As an alternative to the local average value, another value such as for example a median or a quantile could also be determined and transferred.

The global characteristics preferably cover the global minimum, the global maximum and the global average of all the tracking errors. As a result, it is then in particular for example possible for the deviation value to be determined by means of the following formula $$K = MAX - TOL \cdot F$$

if the global average value lies closer to the global minimum than to the global maximum, and is determined by means of the following formula $$K = MIN + TOL \cdot F$$

If the global average value lies closer to the global maximum than to the global minimum, with MIN being the global minimum, MAX the global maximum, TOL being a tolerance value and F a factor between zero and one. As a result, the auxiliary axes then also orient themselves to "outliers" and not to the remaining auxiliary axes essentially driven synchronously to one another.

The factor can be variable. In particular it can depend on the temporal derivation of the position value of the control axis and on the temporal derivation of the global minimum or on the temporal derivation of the global maximum. The tolerance value usually corresponds to the difference between the global average value and the global minimum or between the global maximum and the global average value, but is restricted to a maximum value. In this process, the maximum value can for example be characteristic of a maximum permissible deviation within the axis arrangement.

The final set position value is preferably determined for each auxiliary axis by means of at least the actual position value of the current control cycle, the difference between the actual position value and the set position value of the preceding control cycle, the deviation value, the factor and the temporal change in the position value of the control axis.

BRIEF DESCRIPTION OF THE DRAWINGS

Further advantages and details of the invention emerge from the description below of an exemplary embodiment and from the accompanying drawings. These schematic diagrams are as follows.

DETAILED DESCRIPTION OF INVENTION

Figure 1:
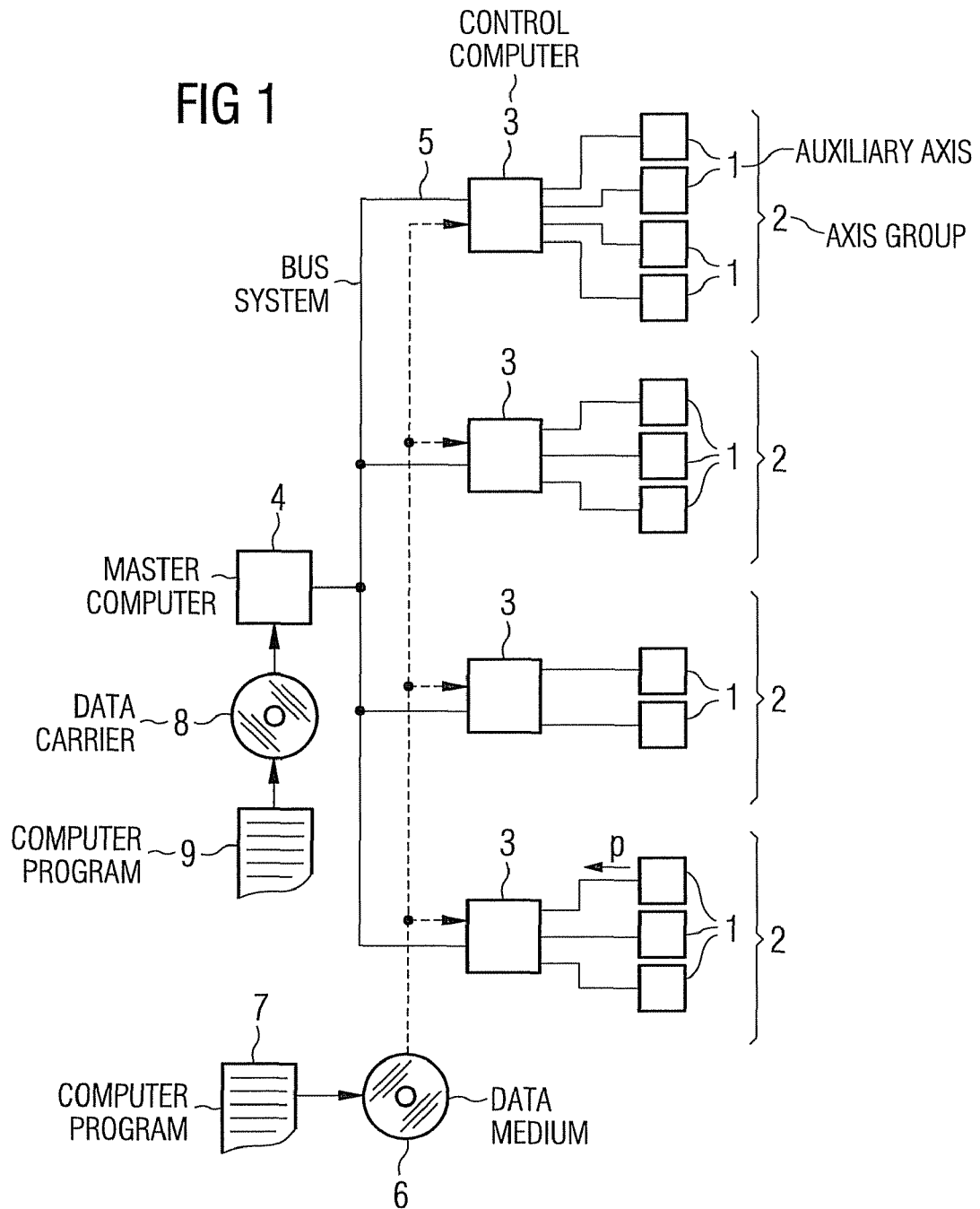
FIG. 1 a block diagram of a drive arrangement,
FIG. 2 an alternative view of FIG. 1 and
FIG. 3 to 6 flowcharts.

In accordance with FIG. 1, an axis arrangement has a plurality of auxiliary axes 1. The auxiliary axes 1 are combined into axis groups 2. Each axis group 2 at least has one auxiliary axis 1. The auxiliary axes 1 of each axis group 2 are position-controlled by means of one control computer 3 in each case.

The auxiliary axes 1 should be driven synchronously to one another. For this purpose, the control computers 3 and a master computer 4 are attached to a bus system 5.

Figure 3:
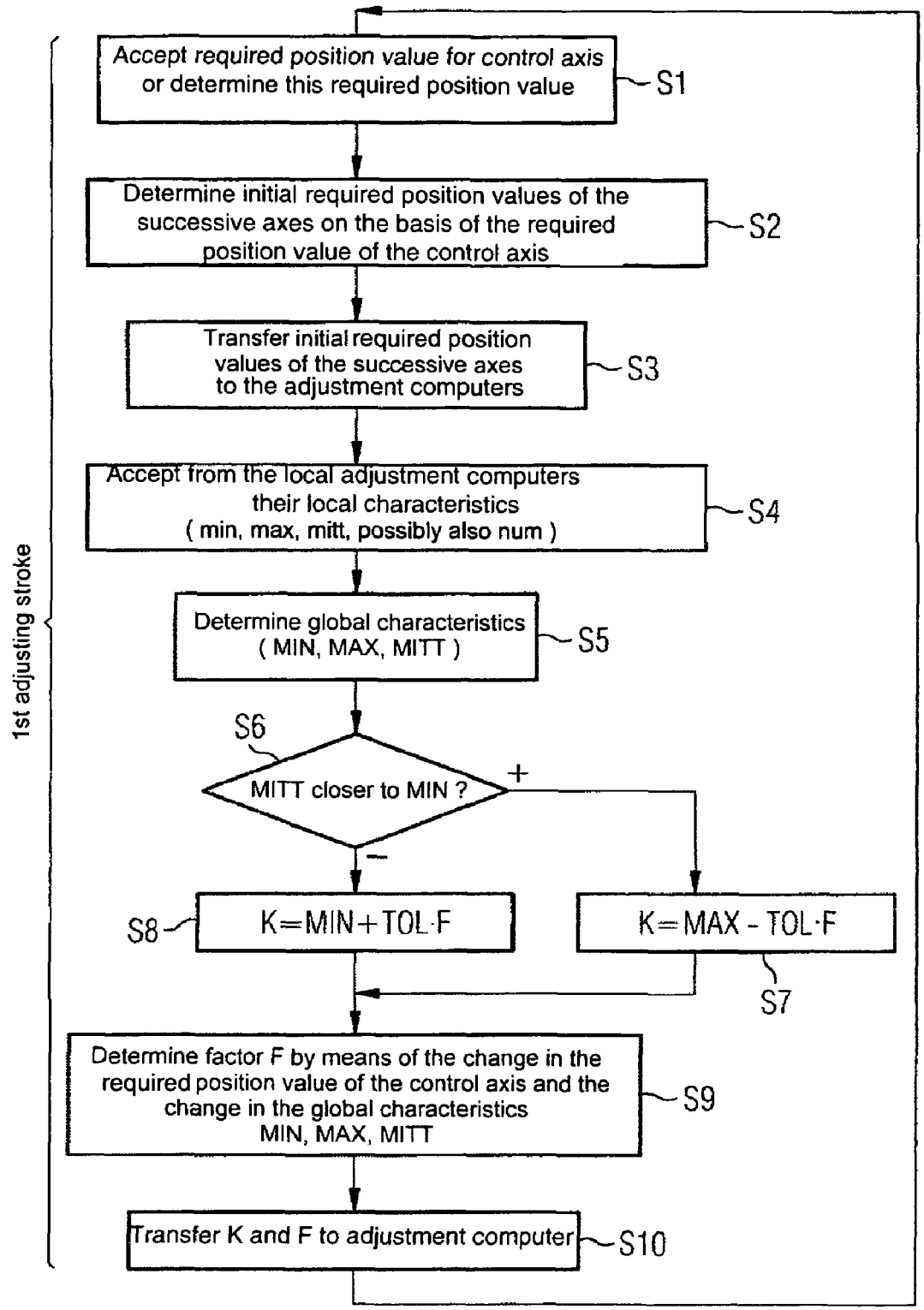
Figure 4:
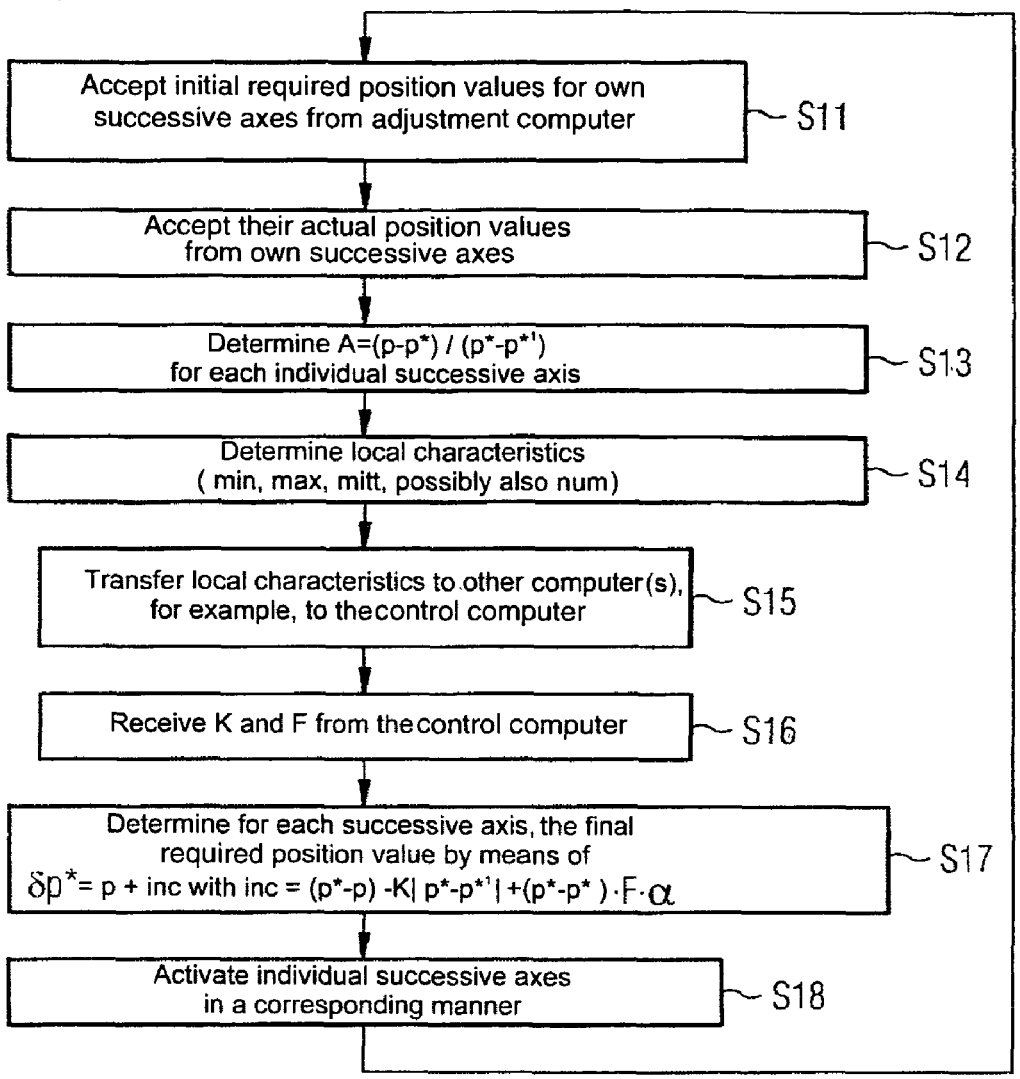

The control computers 3 are software programmable. The mode of operation of the control computers 3 can thus be determined by means of a data medium 6 in which a computer program 7 for the control computers 3 is stored. Likewise, the master computer 4 is also software-programmable. The mode of operation of the master computer 4 can thus be determined by means of a data carrier 8, in which a computer program 9 for the master computer 4 is stored. Due to their programming, the master computer 4 and the control computers 3 implement a control method for the auxiliary axes 1 which is described in more detail below in connection with FIGS. 2 to 6. In this process, the central point of the method is the procedure in accordance with FIG. 2. FIGS. 3 and 4 illustrate a first embodiment of the control method in accordance with the invention and FIGS. 5 and 6 a second embodiment.

Figure 2:
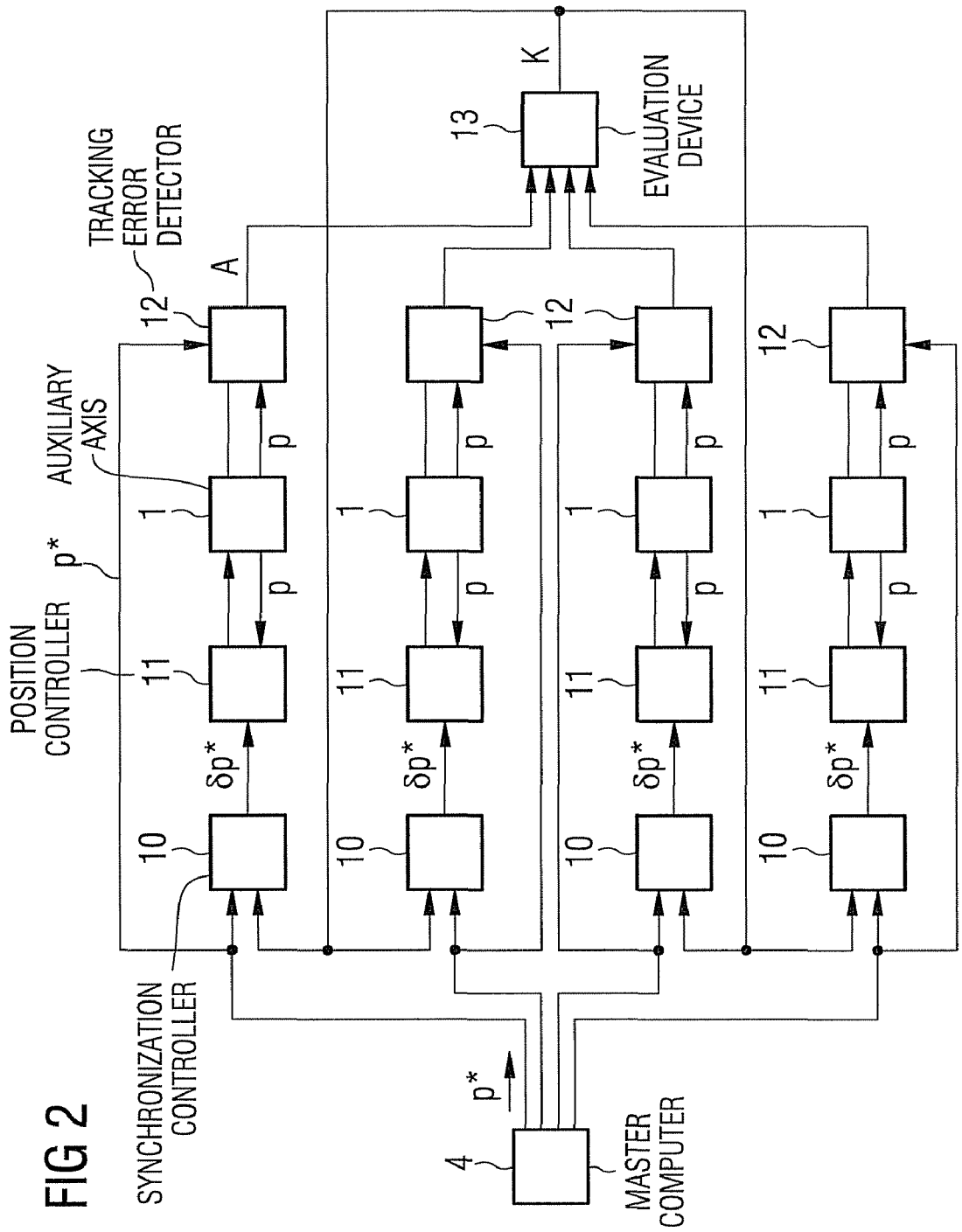

In accordance with FIG. 2, in each control cycle, an initial set position value p* is determined for each auxiliary axis 1 by means of the position value (set value or actual value) or the temporal derivation of the position value of a control axis to which a number of auxiliary axes 1 are subordinated. The initial set position values p* of the auxiliary axes 2 can thus be in a linear (transmission) or in a non-linear (cam disc) relationship with the position value of the control axis. They can also be determined directly by means of the position value of the control axis or by means of a position value (actual or set), preferably the initial set position value p* of an intermediate auxiliary axis 1.

The initial set position values p* are passed on to subordinate synchronization controllers 10. In this process, an own synchronization controller 10 is available for each auxiliary axis 1. The synchronization controllers 10 determine, as will be described in more detail below, one final set position value δp* in each case and pass on this final set position value δp* to position controllers 11, which then control the position of the specific auxiliary axis 1 in each case.

For each auxiliary axis 1, an actual position value p is detected. By means of the actual position value p and the initial set position value p* of the specific auxiliary axis 1, a tracking error detector 12 for example determines tracking error A—in accordance with the following formula $$A=(p^*-p)/(p^*-p^{*\prime}) \quad (1)$$

The value $p^{*\prime}$ is thus the initial set position value of the previous control cycle. The determination of the tracking error A in accordance with the above formula is in particular of advantage, because as a result the tracking error A of the specific auxiliary axis 1 is standardized.

If necessary, for example due to (weighted or non-weighted) average value formation, a lowpass filtering or other filter measures, a smoothing could also take place.

The tracking errors A are supplied to an evaluation device 13. Said device carries out a statistical evaluation of the tracking errors A. The evaluation device 13 in particular determines a deviation value K, which is valid for all the auxiliary axes 1. In this process, the evaluation can take place either centrally (for example in the master computer 4) or in a distributed manner (for example in the control computers 3).

The evaluation device 13 supplies the deviation value K to the synchronization controllers 10, which then determine the final set position value δp* by means of the actual position value p of the specific auxiliary axis 1 in each case and this deviation value K, on which the position of the specific auxiliary axis 1 is controlled.

Figure 5:
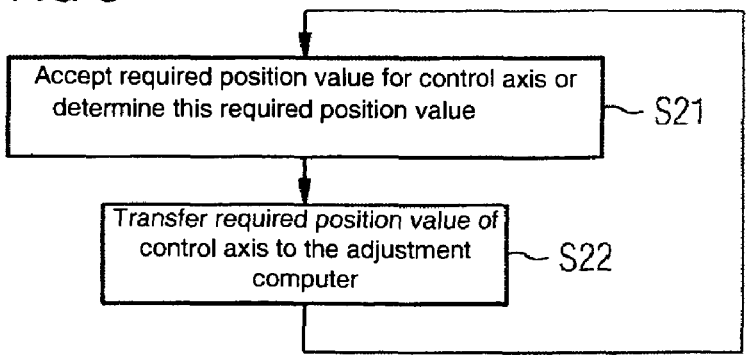

Due to this procedure briefly outlined above, which will be explained in more detail below in connection with FIGS. 3 to 6, the position synchronization can be decoupled from the absolute tracking errors to the control axis. It should be mentioned that the procedure in accordance with the invention is not bound to a certain computer-oriented structure. In particular, the entire control method could be implemented in only one computer. As an alternative, the evaluation device 13 can also be arranged in a distributed manner in the master computer 4 or in the control computers 3. The bus system 5 could also be arranged as a multi-level system. The two procedures described hereinafter in connection with FIGS. 3 and 4 as well as in connection with FIGS. 5 and 6 are thus not the only possible procedures, but are only exemplary procedures.

In accordance with FIG. 3, the master computer 4 receives, in a step S1, the set position value for the control axis or determines said value of its own accord. Which of these two procedures is adopted is thus of secondary importance within the framework of the present invention. This is because, within the framework of the present invention, the set position value is not actually output on the control axis to a drive. The control axis is thus only a virtual axis. For example, a corresponding positioning command can be output to the control axis.

In a step S2, the master computer 4 then also determines the initial set position values p* for each auxiliary axis 1 by means of the set position value of the control axis. The master computer 4 transfers these set position values p* in a step S3 to the control computers 3.

In a step S4, the master computer 4 receives the local characteristics min, max, mitt and possibly num from the control computers 3. Theoretically, the tracking errors A of auxiliary axis 1 itself could be accepted. However, the local characteristics min, max, mitt (in addition, num if necessary) are preferably already statistical values. The number of local characteristics min, max, mitt and possibly num is thus preferably the same for all the control computers 3. It is independent of the number num of auxiliary axes 1, the position of which is controlled by the specific control computer 3 and also independent of the maximum number of auxiliary axes 1 that can be controlled by the specific control computer 3 in each case. The number of local characteristics min, max, mitt (and possibly num) typically amounts to three or four.

The local characteristics min, max, mitt and possibly num of the control computers 3 are in accordance with the exemplary embodiment characteristic of the minimum min, the maximum max and the average value mitt of the tracking errors A of the auxiliary axes 1, the position of which is controlled by the specific control computer 3 in each case. In the simplest case, they directly contain these values min, max and mitt. Instead of the local average value mitt, it could for example also be possible to transfer, as an alternative, a median or a quantile of the tracking errors A of the auxiliary axes 1 controlled by the specific control computer 3. The local minimum min and the local maximum max could also be replaced by other suitable characteristics.

In a step S5, the master computer 4 determines the global characteristics MIN, MAX, MITT by means of the local characteristics min, max, mitt, num of the control computers 3 and thereby, as a result, by means of the tracking errors A of all the auxiliary axes 1. By means of the global characteristics MIN, MAX, MITT it can be identified as to whether at least one of the auxiliary axes 1 clearly exhibits a different tracking error A to that of the other auxiliary axes 1. For example the global characteristics MIN, MAX, MITT contain for this purpose at least the global minimum MIN, the global maximum MAX and the global average value MITT of the tracking errors A of all the auxiliary axes 1 of the axis arrangement.

In order to determine the global characteristics MIN, MAX, MITT, the master computer 4 must be conversant with which control computer 3 controls how many auxiliary axes 1. There are two possibilities for this. On the one hand, it is possible that in the master computer 4 it is projected which control computers 3 are present and how many auxiliary axes 1 these control in each case. On the other hand, it is possible that in addition the local characteristics min, max, mitt, num are also characteristic of a number num of auxiliary axes 1, the position of which being controlled by the specific control computer 3 in each case. In the simplest case, the local characteristics min, max, mitt, num therefore, in addition to the local minimum min, the local maximum max and the local average value mitt, contain a fourth value num, which is characteristic of a number num of auxiliary axes 1 of the specific control computer 3 in each case.

In a step S6, the master computer 4 checks whether the global average value MITT lies closer to global minimum MIN or to global maximum MAX. In the first case, the master computer 4, in a step S7, determines the deviation value K according to $$K=\text{MAX}-\text{TOL}\cdot F \quad (2).$$

In this process TOL is a tolerance value that is usually equal to the difference between the global average value MITT and the global minimum value MIN, but in the case of a large difference is limited to a maximum value.

In the second case, the master computer 4 determines, in a step S8, the deviation value K according to $$K = \text{MIN} + \text{TOL} \cdot F \quad (3).$$

In this case TOL is again a tolerance value that is usually equal to the difference between the global maximum MAX and the global average value MITT, but in the case of a large difference however is also limited to a maximum value.

Furthermore, the master computer 4 determines a factor F within the framework of a step S9. As a result, the factor F is variable. The determination of the factor F can for example take place by means of the change in the set position value of the control axis and the temporal change in the global characteristics MIN, MAX, MITT. However, the determination of the factor F is optional. The factor F, in particular, can have a value between 0 and 1.

The deviation value K and also the factor are transferred in a step S10 to the control computers 3. If necessary, the global characteristics MIN, MAX, MITT could also be transferred. In this case, the control computers 3 can determine the deviation value K and the factor F themselves.

On the other hand, the control computers 3 again receive, from the master computer 4, in accordance with FIG. 4 in a step S11, the initial set position values p* for their respective auxiliary axes 1. In addition, in a step S12, they receive from their respective auxiliary axes 1, the said actual position values p.

The control computers 3, in a step S13, then determine for each auxiliary axis 1, the position of which being controlled by said computer, the tracking error A, and indeed preferably in accordance with the formula, which has already been mentioned and explained above in connection with FIG. 2. As a result, by means of the tracking errors A, the control computers 3, in a step S14 can determine for the auxiliary axes 1, the position of which being controlled by said computer, as local characteristics of the tracking errors A, the local minimum min, the local maximum max and the local average value mitt. If necessary, the control computers 3 can also determine a number num of the auxiliary axes 1. However, it is preferably projected.

The local characteristics min, max, mitt and if necessary also num are transferred by the control computer 3 in a step S15—for example, in a telegram—to the master computer 4. In a step S16, they receive the deviation value K and the factor F from the master computer 4.

By means of the deviation value K and the factor F the control computers 3 then determine, in a step S17, for each auxiliary axis 1, the position of which is controlled by said computers, an increment inc for the specific auxiliary axis 1. In this process, said determination takes place by means of the difference between the initial set position value p* and the actual position value p for this auxiliary axis 1, the deviation value K, the factor F and if necessary further values. It preferably takes place in accordance with the formula $$inc = (p^* - p) - K \cdot |p^* - p^{*\prime}| + (p^* - P^*) \cdot F \cdot \alpha. \quad (4)$$

By including the actual position value p of the specific auxiliary axis 1, the control computers 3 then determine the final set position value δp* according to $$\delta p^* = p + inc \quad (5)$$

In this process, the difference between the original set position value p* and the actual position value p in formula 4 refers to the preceding control cycle, with regard to which the deviation value K and the factor F were also determined. The difference between the original set position values p* and p*' refers to the current and the preceding control cycle. α is a factor, which depends, inter alia, on the temporal change in the position value of the control axis. p in formula 5 is the actual position value of the current control cycle.

In a step S18, the control computers 3 then activate the auxiliary axes 1, which are controlled by said computers in a corresponding manner. As a result, by means of the procedure in accordance with the invention—in particular with the determination of the deviation value K—it is achieved that the auxiliary axes 1 at least have a tendency to follow an "outlying" auxiliary axis 1.

The operation of the master computer 4 and the control computer 3 in accordance with FIGS. 5 and 6 corresponds, from the beginning, to the operation of the master computer 4 and the control computer 3 in accordance with FIGS. 3 and 4. However, contrary to FIGS. 3 and 4, the determination of the deviation value K and the factor F now also takes place on the part of the control computer 3. In order to avoid repetitions, in view of the explanation of FIGS. 5 and 6, reference however is made to FIGS. 3 and 4, in so far as this is meaningful.

FIG. 5 exhibits only the steps S21 and S22. Step S21 corresponds to a step S1 of FIG. 3. In a step S22, the position value (set or actual) of the control axis is transferred to the control computers 3.

The operation of the control computers 3 in accordance with FIG. 6 corresponds mostly to the joint operation between the master computer 4 of FIG. 3 and the control computer 3 of FIG. 4. In particular, the control computers 3 in accordance with FIG. 6 carry out the steps S31 to S44, of which only the step S31 is new. This is because, in the step S31, the control computers 3 receive from the master computer 4 the position value of the control axis. Step S32 by contrast corresponds to step S2 of FIG. 3, steps S33 to S36 correspond to steps S12 to S15 of FIG. 4, steps S37 to S42 to steps S4 to S9 of FIG. 3 and the steps S43 and S44 to the steps S17 and S18 of FIG. 4. Steps S31 to S44 are thus not described individually once again below. It is only mentioned for the sake of completeness that it is possible to work in broadcast mode in a step S36. In this case, each control computer 3 thus transfers the local characteristics min, max, mitt sent by said computer and if necessary also num to all the other control computers 3 at the same time.

In accordance with FIGS. 5 and 6, the function of the master computer 4 is thus reduced to the setting of the set position value of the control axis. The entire remaining functionality, including the determination of the initial set position values p* for the auxiliary axes 1 and also the factor F, is undertaken by the control computers 3. Conversely however, the entire control method could also be implemented in only one computer 3, 4. It is also possible for the master computer 4 to be identical to one of the control computers 3. The configuration that is to be adopted is at the discretion of the person skilled in the art.

In the case of the procedures of FIGS. 5 and 6 described above, the control computers 3 themselves represent correction computers for the auxiliary axes 1, the position of which being controlled by said computers in each case, which determine the deviation value K and the final set position values δp* of the auxiliary axes 1. Whereas, on the other hand in the case of the procedure of FIGS. 3 and 4, in the case of which the global characteristics MIN, MAX, MITT and also the deviation value K are determined in a central manner (thus, in the master computer 4) and the deviation value K is transferred further to the control computers 3, the master computer 4 represents the correction computer. This only really applies if the master computer 4 also determines the final set position values δp*, which would likewise be possible in principle.

Thus the inventive method enables a synchronization of the auxiliary axes 1 can be achieved, with considerable tracking errors A in relation the control axis being able to be tolerated at the same time. This is because in the case of the method in accordance with the invention, the auxiliary axes 1 automatically follow an "outlier". For this reason, switching to an error mode in the case of single errors becomes superfluous. Multiple errors can also—at least partially—be controlled. Further, some consequential errors can be avoided. Finally, it is possible on the basis of the determination and the processing of the local and global characteristics min, max, mitt, num, MIN, MAX, MITT, to reduce the computation outlay and the communication effort. As a result, even large drive arrangements can be controlled.

The invention claimed is:

1. A control method for an axis arrangement, wherein the axis arrangement has a number of auxiliary position-controlled axes controlled in a control cycle, comprising:

determining in each control cycle a specific initial set position value for each auxiliary axis based on a position value or a temporal derivation of the position value of a control axis not integrated in the axis arrangement, wherein a plurality of auxiliary axes are subordinated to the control axis;

detecting in each control cycle a specific actual position value for each auxiliary axis;

determining in each control cycle a specific tracking error based on the specific actual position value and the specific initial set position value of the specific auxiliary axis;

determining in each control cycle a deviation value valid for all the auxiliary axes, based on the tracking errors of the auxiliary axes; and determining in each control cycle a final set position value for each auxiliary axis, based on the deviation value and the specific initial set position value of the auxiliary axis, wherein the auxiliary axis are position controlled based on the final set position value.

2. The control method as claimed in claim 1, wherein the tracking errors determined for the auxiliary axes are standardized.

3. The control method as claimed in claim 1, wherein the control axis is a virtual axis.

4. The control method as claimed in claim 1, wherein global characteristics are determined based on the tracking errors of all the auxiliary axes, wherein based on the global characteristics it is identified whether at least one of the auxiliary axes exhibits a tracking error other than that of the other auxiliary axes, and wherein the deviation value is determined based on the global characteristics such that the other auxiliary axes at least have a tendency to follow the at least one auxiliary axis exhibiting a tracking error other than that of the other auxiliary axes.

5. The control method as claimed in claim 4, wherein:

the auxiliary axes are combined into axis groups with at least one auxiliary axis in each case, the auxiliary axes of each axis group are position-controlled via a control computer in each case, every control computer determines the tracking errors of the auxiliary position-controlled axes, every control computer determines a number of local characteristics based on the tracking errors determined by it and outputs it by means of a bus system, to which at least the control computers are connected, the local characteristics of at least one correction computer connected to the bus system are received, and the at least one correction computer determines the global characteristics based on the local characteristics of the control computers, determines the deviation value by means of the global characteristics and makes available at least one deviation value to the control computer.

6. The control method as claimed in claim 5, wherein the correction computer is distributed over the control computers.

7. The control method as claimed in claim 5, wherein the correction computer is a master computer.

8. The control method as claimed in claim 5, wherein the local characteristics are the tracking errors of the auxiliary axes, and wherein the auxiliary axes are position controlled by the control computer assigned to the particular auxiliary axes.

9. The control method as claimed in claim 5, wherein the number of local characteristics for all the control computers is the same, wherein the number of local characteristics is independent of the number of auxiliary axes position controlled by the specific control computers, and wherein the number of local characteristics is also independent of a maximum number of auxiliary axes controllable by the control computers.

10. The control method as claimed in claim 9, wherein the local characteristics are characteristic of the minimum, the maximum and the average value of the tracking errors of the auxiliary axes, wherein the position of the auxiliary axis is controlled by the specific control computer.

11. The control method as claimed in claim 10, wherein the local characteristics are also characteristic of the position controlled auxiliary axes.

12. The control method as claimed in claim 9, wherein the local characteristics are characteristic of the minimum and the maximum as well as a median or a quantile of the tracking errors of the auxiliary axes controlled by the specific control computer.

13. The control method as claimed in claim 4, wherein the global characteristics contain a global minimum, a global maximum and a global average value of the tracking errors of all auxiliary axes.

14. The control method as claimed in claim 13, wherein the auxiliary axes are at least partly position-controlled in a direction of the global minimum or the global maximum, depending on whether the global minimum or the global maximum is further away from the global average value.

15. The control method as claimed in claim 14, wherein the deviation value is determined based on a first formula $K=\text{MAX}-\text{TOL}\cdot F$ if the global average value lies closer to the global minimum than to the global maximum, and wherein the deviation value is determined based on a second formula $K=\text{MIN}+\text{TOL}\cdot F$ if the global average value lies closer to the global maximum than to the global minimum, wherein MIN is the global minimum, MAX is the global maximum, TOL is a tolerance value and F is a factor between zero and one.

16. The control method as claimed in claim 15, wherein the factor is variable.

17. The control method as claimed in claim 16, wherein the factor depends on the temporal derivation of the position value of the control axis or and further either on the temporal derivation of the global minimum or the temporal derivation of the global maximum.

18. The control method as claimed in claim 17, wherein for each auxiliary axis a final set position value is determined based on at least
- the actual position values of the current control cycle,
- the difference between the actual position value and the set position value of the preceding control cycle,
- the deviation value,
- the factor, and
- the temporal change in the position value of the control axis.

19. The control method as claimed in claim 16, wherein for each auxiliary axis a final set position value is determined based on at least
- the actual position values of the current control cycle,
- the difference between the actual position value and the set position value of the preceding control cycle,
- the deviation value,
- the factor, and
- the temporal change in the position value of the control axis.

20. The control method as claimed in claim 15, wherein for each auxiliary axis a final set position value is determined based on at least
- the actual position values of the current control cycle,
- the difference between the actual position value and the set position value of the preceding control cycle,
- the deviation value,
- the factor, and
- the temporal change in the position value of the control axis.

* * * * *